March 7, 1939.  G. H. J. BAULE  2,150,019
BOOSTER MECHANISM
Filed April 14, 1937
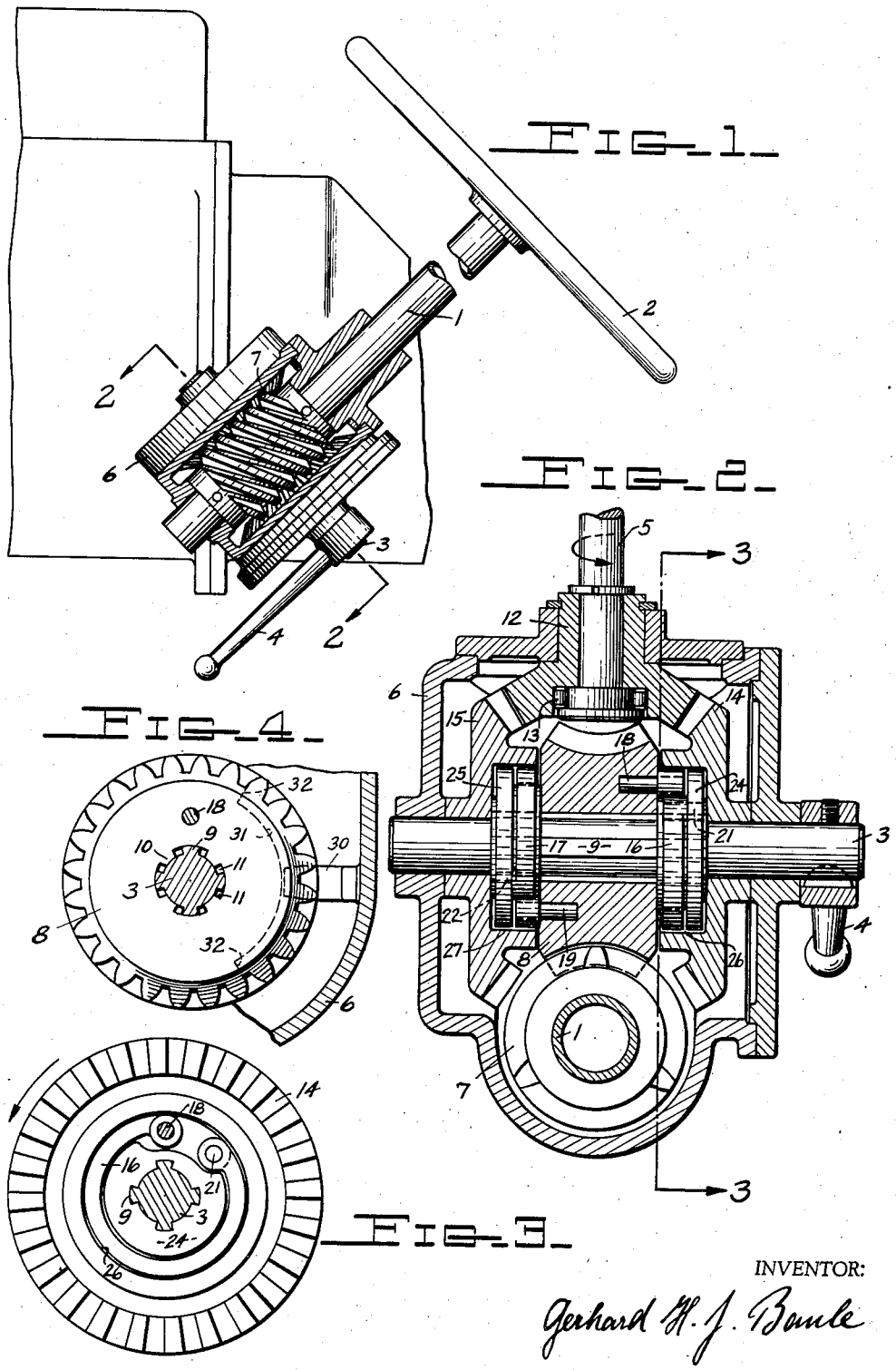
INVENTOR:
Gerhard H. J. Baule Patented Mar. 7, 1939

2,150,019

UNITED STATES PATENT OFFICE 2,150,019

BOOSTER MECHANISM

Gerhard H. J. Baule, Syracuse, N. Y.

Application April 14, 1937, Serial No. 136,861

6 Claims. (Cl. 74—388)

This invention relates to power booster mechanism, and it has for its object a booster mechanism, which is controlled by a progressively-movable, operator-operated control member, as a manual or pedal, which, when operated, clutches a power-actuated, motion-transmitting member, as a gear, to a driven member, as a shaft, so that the shaft is actuated by power and the power driving connection is maintained as long as the control member is progressively operated in synchronism with the advance of the driven member by the power, and ceases to be power operated when the control member is released, or the operator discontinues actuating it to follow up the actuation of the driven member or shaft by the power drive.

It further has for its object a power booster mechanism controlled by the progressively-movable, operator-operated member, by which movement of the control member in one direction effects the actuation of the driven shaft or member in one direction by power, and movement of the control member in the opposite direction effects a reverse movement of the driven member or shaft by power, in each case, the power drive being discontinued in synchronism with the advance of the driven member or shaft.

It further has for its object power booster mechanism controlled by a progressively-movable, operator-operated control member in which the control member actuates the driven member, if the power fails to act.

Other objects appear throughout the specification.

This booster mechanism may be employed in any situation where it is desired to boost by power and control the boosting, as for instance, in machines having an opening and a closing movement, as garment and laundry pressing machines, particularly those types of pressing machines, where the operator uses skill and technique in the pressing operation or applies different degrees of power pressure and the control of the closing of the press by power is sensitive to the manuals or pedals of the machine.

The invention consists in the novel features and in the combinations and constructions hereinafter set forth and claimed.

In describing this invention, reference is had to the accompanying drawing, in which like characters designate corresponding parts in all the views.

Figure 1 is an elevation, partly in section, of this mechanism, with the contiguous portion of the power plant of an automobile and also the steering wheel being shown.

Figure 2 is an enlarged sectional view on line 2—2, Figure 1.

Figures 3 and 4 are sectional views taken approximately on the plane of line 3—3, Figure 2, looking in opposite directions, Figure 3 looking to the right and Figure 4 looking to the left.

This power booster mechanism comprises, generally, a progressively-movable, operator-operated control means, a driven member or shaft, power-actuated mechanism and self-releasing clutch mechanism operable by the control member, when moved from initial position, to clutch the driven member or shaft to the power mechanism and to hold the same clutched together as long as the operator progressively applies sufficient force to the control member or moves the control member in synchronism with the advance of the driven member or shaft by the power mechanism, and to unclutch or release, when the operator releases the control member or moves it in the opposite direction, or fails to move the control member to keep up with the advance of the driven member or shaft by the power mechanism.

In the illustrated embodiment of my invention, I have shown this booster mechanism as applied to the steering mechanism of a motor vehicle, so that movement of the control member or steering post in either direction serves to selectively operate one or the other of two clutches, it operating one clutch, when moved in one direction, and operating the other clutch, when moved in the other direction, to clutch the driven shaft, which effects the steering, to the power shaft, through the gearing.

The operator-operated control member includes the steering column 1 of the steering mechanism of a motor vehicle, this having the usual hand or tiller wheel 2. 3 designates a driven member or shaft, which is connected to the steering or ground wheels of the vehicle, through the usual steering knuckles, this shaft being here shown as provided with a rock arm or lever arm 4 for connection to the steering knuckles through any suitable mechanism.

5 designates a power-operated drive member or shaft, this being the drive shaft of the booster mechanism, and it being connected in any suitable manner to a source of power, as the crank shaft of the engine of the vehicle or any shaft which is being operated, when the engine is running, as the drive shaft or the counter shaft of the transmission gearing. The shaft 5 is preferably coupled to some part, which is rotating, when the engine is running, in order that the steering wheels may be turned by power, when the vehicle is standing still.

The steering column 1 and shafts 3 and 5 are shown as mounted in a suitable casing 6, which may be supported on the vehicle in any suitable manner, the steering column 1 being here shown as having a worm 7 thereon meshing with the worm gear 8 mounted on the driven shaft 3. The gear 8 is connected to the shaft 3 to rotate therewith through a lost motion connection for a purpose to be presently described.

As here shown (Figure 4) it is splined on the shaft 3 with the splines 9 and 10 on the shaft and the gear 8, respectively, of less width than the spaces between the splines, providing a lost motion, as at 11, (Figure 4). In addition to the shaft 5, the power-operated drive mechanism includes a gear 12 mounted on the shaft 5 to rotate therewith through an over-running clutch 13, the purpose of which will be hereinafter described, and side gears 14 and 15 mounted on the shaft 3 to rotate about the same and located on opposite sides of the worm gear 8 and opposed thereto and rotating in opposite directions.

The self-releasing clutch mechanism operated by the control member 1 through the gear 8 serves to selectively clutch either the gear 14 or 15 to the driven shaft 3 in accordance with the direction the column 1 is turned by the tiller wheel 2. The clutches are here shown as expanding clutches of the friction type, and each includes an expander or arcuate shoe 16 or 17 anchored at one end at 18 or 19 to the gear 8 and at its other end at 21 or 22 to the shaft 3 or a collar 24 or 25 on the shaft, each collar and expander being located in a cylindrical recess 26 or 27 in the gear 14 or 15, which recesses are concentric with the shaft 3 and open toward opposite sides of the gear 8. The cylindrical wall of each recess constitutes a friction clutch drum. The expanders are reversely arranged relative to each other. As the expander 14 or 15 is resilient and under tension or compression, when operated, it re-acts when the force tending to hold it expanded is discontinued. Hence, the clutches are self-releasing.

Turning of the steering post 1 to the right to cause the worm gear 8 to be turned to the left (Figure 3) causes the anchor pin 18 to be pushed to the left and push against the anchor pin 21 and the member 16 to expand into frictional engagement with the cylindrical wall of the drum of the gear 14, thus clutching the wheel 14 to the shaft 3, so that the shaft 3 is driven from the shaft 5 through the gears 12, 14. Power continues to be applied as long as the operator continues to progressively turn the steering column and keep the member 16 expanded. When the operator ceases to turn the column 1 to follow up the advance of the shaft 3 by the power shaft 5, the expander 16 contracts or releases, so that the power is disconnected from the shaft 3. The lost motion at 11 provides for initial movement of the steering column 1 sufficient to engage one or the other of the clutches. When both clutches are released, the gears 14 and 15 merely idle about the shaft 3 and when one of the clutches is engaged to lock one of the gears 14 or 15 to the shaft 3, the other gear 14 or 15 merely idles.

If for any reason, one or the other, or both, clutches fail to act, the shaft 3 will be turned by sufficient force applied to the steering column 1 in the ordinary manner, after the lost motion at 11 is taken up. The over-running clutch 13 is provided to permit the hand operation of the steering mechanism in the event, for any reason, the shaft 5 is stationary and hand steering necessary.

Preferably, the power drive rotates faster than the maximum manual drive, so that the power drive engages and disengages intermittently, hence the power drive effects the steering of the vehicle in accordance with the momentary speed at which the driver happens to turn the steering wheel. The moment the tiller wheel or worm gear 8 is held stationary or is not turned, the expanded band of the clutch contracts and disengages the power from the shaft 3. If the power is disengaged intentionally, as by mechanism not shown, or, if the power should fail, the steering can be accomplished manually in the ordinary manner. If the clutches should become defective and fail to act, manual steering is accomplished by turning the steering column and taking up the lost motion at 11 and then transferring the power of the steering column 1 to the shaft 3 through the worm gear 8.

Shocks created by the steering or ground wheels striking bumps or obstructions in the roads, tending to turn the steering or ground wheels, and transferred through the steering connections to the shaft 3 also tend to engage one or the other of the clutches, depending on the direction of the shock. Thus, for instance, if the shock tends to engage the clutch member 16 (Figure 3), anchor pin 21 will be moved in a clockwise direction and with the anchor pin 18 stationary, will engage clutch member 16 with the gear 14, which rotates in a counter-clockwise direction, so that the power is automatically momentarily applied to the steering mechanism in opposition to the shock, and hence resets the wheels to the position they occupied before the shock was encountered.

Means is provided for limiting the turning of the tiller wheel just prior to the time the ground wheels reach the limit of their steering angle. As here shown, this means coacts with the worm wheel 8 and is shown as consisting of a stationary shoulder 30, here shown as on a wall of the casing 6, projecting into a peripheral, circumferentially extending groove 31 in the worm wheel, the ends 32 of the groove serving as stops coacting with the shoulder, when the worm, and hence, the tiller wheel, is turned to its position occupied just prior to the time the ground steering wheels reach the limit of the turning angle. When the tiller wheel has been turned to the limit of its movement in either direction, the ground wheels have not quite reached the limit of their turning angle. Under this condition, the expander 16 or 17 of the clutch engaged will contract under its power drive and release. For instance, assuming that the expander 16 is expanded, the worm has been turned to the limit of its movement, as the ground wheels approach the limit of their turning angle and the operator continues to hold the tiller wheel, the anchor pin 18 (Figure 3) will then be held stationary and the pin 21 will advance toward it under the rotating of the gear 14, thus effecting the contraction and release of the expander 16.

In operation, turning of the tiller wheel in either direction engages the one or the other of the clutches 16, 17 and clutches the shaft 3 to the gear 14 or 15, so that the shaft 3 is turned in one direction or the other through the gears 12, 14 or 12, 15, as long as the operator applies sufficient force to the tiller wheel to hold the expander 16 or 17 expanded. Upon release of the force applied to the tiller wheel, the engaged clutch releases and the shaft 3 is free of the power drive.

What I claim is:

1. In a booster mechanism, the combination of a progressively-movable, operator-operated control member, a driven member, a gear mounted on the driven member, the control member being operable to turn the gear and the gear being connected to the driven member by a lost motion connection, a power shaft, gearing between the power shaft and the driven member including a gear mounted to rotate about the driven member, and a self-releasing clutch operable by the relative rotation of the first gear to the driven shaft to clutch the second gear to the driven shaft, and held in clutching engagement by the progressive follow-up movement of the control member.

2. In a booster mechanism, the combination of a progressively-movable, operator-operated control member, movable in opposite directions, a driven member, a gear mounted on the driven member and connected thereto by a lost motion connection, the gear being operatively connected to the control member, a power drive shaft, two sets of gearing between the power shaft and the driven member including oppositely-movable gears normally freely rotatable about the driven shaft, and clutches operable by the relative movement of the first gear to the driven member in one direction or the other by the control member, when actuated in one direction or the other, to selectively clutch the reversely movable gears to the driven member, and connections between the clutches and the first gear and between the clutches and the driven member.

3. In a power booster mechanism, the combination of a progressively-movable, operator-operated control member, a driven member, a power-operated drive mechanism, a motion-transmitting member mounted on the driven member and connected thereto by a lost motion connection and being also operatively connected to the control member to be actuated thereby, the power drive mechanism including a shaft, and gearing operated thereby including a gear mounted on the driven member and rotatable relatively thereto and having a clutch drum, and a clutch including an expander within the drum, and when operated, coacting therewith, the expander being anchored at one end to the motion-transmitting member on the driven member and at its other end to the driven member.

4. In a booster mechanism, the combination of a progressively-movable, operator-operated control member, movable in opposite directions, a driven shaft, power-operated drive mechanism, a gear mounted on the shaft and connected thereto by a lost-motion connection, and operatively connected to the control member to be operated thereby, the power drive mechanism including a drive shaft, a gear rotatable therewith, a pair of gears mounted on the driven shaft on opposite sides of the first gear and meshing with the gear on the drive shaft, whereby they are rotated by the power drive shaft in opposite directions, each of the pair of gears being formed with a recess concentric with the driven shaft and opposed to the first gear, an expanding clutch means mounted in each recess and each anchored at one end to the first gear and at its other end to the driven shaft, the clutches being reversely arranged relatively to each other, whereby upon turning of the first gear by the control member in one direction, one or the other of the expanders are expanded to clutch the corresponding gear of the pair to the driven shaft.

5. In a booster mechanism, the combination of a progressively-movable, operator-operated control member, movable in opposite directions, a driven shaft, power-operated drive mechanism, a gear mounted on the shaft and connected thereto by a lost-motion connection, and operatively connected to the control member to be operated thereby, the power drive mechanism including a drive shaft, a gear rotatable therewith, a pair of gears mounted on the driven shaft on opposite sides of the first gear and meshing with the gear on the drive shaft, whereby they are rotated by the power drive shaft in opposite directions, each of the pair of gears being formed with a recess concentric with the driven shaft and opposed to the first gear, an expanding clutch means mounted in each recess and each anchored at one end to the first gear and at its other end to the driven shaft, the clutches being reversely arranged relatively to each other, whereby upon turning of the first gear by the control member in one direction, one or the other of the expanders are expanded to clutch the corresponding gear of the pair to the driven shaft, and an over-running clutch between the drive shaft and the gear thereon.

6. In a booster mechanism, the combination of a progressively-movable, operator-operated control member, a driven member, a gear mounted on the driven member, the control member being operable to turn the gear, a power shaft, gearing between the power shaft and the driven member including a gear on the power shaft and connected thereto by an over-running clutch and oppositely-movable gears normally freely rotatable about the driven shaft and meshing with the gear on the power shaft, and clutches operable by the relative movement of the first gear to the driven member in one direction or the other by the control member when actuated in one direction or the other to selectively clutch the reversely-movable gears to the driven member, and connections between the last clutches and the first gear and between the last clutches and the driven member.

GERHARD H. J. BAULE.